US011454194B2

(12) United States Patent
Boileau et al.

(10) Patent No.: US 11,454,194 B2
(45) Date of Patent: Sep. 27, 2022

(54) NACELLE FOR TURBOJET ENGINE, COMPRISING OPENINGS OF FRONT COWLS FOR ACCESS TO FIXING POINTS OF THE NACELLE

(71) Applicant: Safran Nacelles, Gonfreville l'Orcher (FR)

(72) Inventors: Patrick Boileau, Gonfreville l'Orcher (FR); Pierre Caruel, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 58 days.

(21) Appl. No.: 16/907,900

(22) Filed: Jun. 22, 2020

(65) Prior Publication Data

US 2020/0325850 A1 Oct. 15, 2020

Related U.S. Application Data

(63) Continuation of application No. PCT/FR2018/053461, filed on Dec. 20, 2018.

(30) Foreign Application Priority Data

Dec. 22, 2017 (FR) ...................................... 1763120

(51) Int. Cl.
*B64D 29/06* (2006.01)
*B64D 29/08* (2006.01)
(Continued)

(52) U.S. Cl.
CPC ................ *F02K 1/72* (2013.01); *B64D 27/16* (2013.01); *B64D 29/06* (2013.01); *B64D 29/08* (2013.01)

(58) Field of Classification Search
CPC ..... F02K 1/70; F02K 1/72; F02K 1/78; F02K 1/80; F02K 1/82; B64D 29/06; B64D 29/08
See application file for complete search history.

(56) References Cited

U.S. PATENT DOCUMENTS

2013/0327886 A1* 12/2013 James ................... B64D 29/02
244/54
2014/0334922 A1* 11/2014 Fabre .................... B64D 29/08
415/201
(Continued)

FOREIGN PATENT DOCUMENTS

CN 104024618 9/2014
CN 105314119 2/2016
(Continued)

OTHER PUBLICATIONS

International Search Report for International Application PCT/FR2018/053461, dated Apr. 15, 2019.

*Primary Examiner* — Andrew H Nguyen
(74) *Attorney, Agent, or Firm* — Burris Law, PLLC

(57) ABSTRACT

A nacelle for a bypass turbojet engine includes a cascade thrust reverser provided with reversal cascades arranged around an annular stream of fresh air, beneath front cowls. The cascades move backward with movable rear cowls, opening side passages in the annular stream, which receive the cascades for directing the fresh air flow forward, the bypass turbojet engine. The bypass turbojet engine includes fixing points, and the nacelle includes outer hatches closing openings of the front cowls, which are arranged radially outside the fixing points for access thereto, each hatch opening including a contour with edges of two front cowls.

5 Claims, 2 Drawing Sheets

(51) Int. Cl.
*F02K 1/72* (2006.01)
*B64D 27/16* (2006.01)

(56) References Cited

U.S. PATENT DOCUMENTS

| 2016/0160799 | A1 | | 6/2016 | Gormley | |
|---|---|---|---|---|---|
| 2017/0328304 | A1 | * | 11/2017 | Gormley | F02K 1/72 |
| 2019/0127075 | A1 | * | 5/2019 | Fleming | B64D 45/0005 |

FOREIGN PATENT DOCUMENTS

| EP | 3095970 | 11/2016 |
|---|---|---|
| FR | 2370616 | 6/1978 |
| FR | 2917710 | 12/2008 |
| GB | 1375868 | 11/1974 |

* cited by examiner

NACELLE FOR TURBOJET ENGINE, COMPRISING OPENINGS OF FRONT COWLS FOR ACCESS TO FIXING POINTS OF THE NACELLE

CROSS-REFERENCE TO RELATED APPLICATIONS

This application is a continuation of International Application No. PCT/FR2018/053461, filed on Dec. 20, 2018, which claims priority to and the benefit of FR 17/63120 filed on Dec. 22, 2017. The disclosures of the above applications are incorporated herein by reference.

FIELD

The present disclosure relates to a nacelle for a turbojet engine, including a cascade thrust reverser delivering a cold air flow forward.

BACKGROUND

The statements in this section merely provide background information related to the present disclosure and may not constitute prior art.

Turbojet engines for motorizing aircraft are disposed in a nacelle, receive fresh air coming from the front side, and eject from the rear side the hot gases produced by combustion of the fuel delivering a thrust.

For bypass turbojet engines, fan blades disposed around the engine generate a significant secondary flow of cold air along an annular flow path passing between this engine and the nacelle, adding a high thrust.

Some nacelles include a thrust reverser system which at least partially closes the annular flow path of cold air, and rejects the secondary flow radially outward by directing it forward in order to generate a reverse thrust for braking the aircraft.

A known type of cascade thrust reverser, presented in particular by U.S. Patent Publication No. 20160160799, includes thrust reverser cascades forming a crown disposed under front cowls, surrounding the annular flow path, which are connected to rear movable cowls, axially sliding backward under the influence of cylinders.

In a closed position of the thrust reverser for a direct flow, the movable cowls close lateral passages outwardly disposed around the annular flow path.

In an open position of the thrust reverser for a reverse flow, the rear cowls maneuvered by cylinders move back on longitudinal guides, by driving the cascades that are located in the lateral air passages. Closing flaps at least partially close the secondary flow behind these passages, by pushing the flow back toward the cascades that reverse the thrust.

Moreover, the different panels or lateral cowls covering the nacelle, include pivots or dismantling systems allowing them to be tilted or completely removed in order to access the elements in the nacelle, particularly the motorization, for maintenance operations.

In addition, the motorization generally includes fastening points on the boundary, disposed particularly radially behind the cascades of the thrust reverser covered by the front cowls when this thrust reverser is closed, forming resistant points receiving handling interfaces to lift and transport the complete motorization with its nacelle.

Particularly, two fastening points can be disposed on the motorization, opposite on a substantially horizontal diameter, in positions called 3 o'clock (3 h) and 9 o'clock (9 h), in order to balance a load of the motorization.

In this case, the front cowls covering the thrust reverser cascades are removed in several places, and the thrust reverser is opened to access the fastening points located behind, in order to carry out the handling of the motorization. Particularly, the front cowls covering the fastening points can form a wide area of the nacelle, which requires the removal of bulky elements.

These various steps demand time, and require space to store the dismantled cowls, which generates constraints and costs.

SUMMARY

This section provides a general summary of the disclosure and is not a comprehensive disclosure of its full scope or all of its features.

The present disclosure includes a nacelle for a bypass turbojet engine, including a cascade thrust reverser equipped with thrust reverser cascades disposed around an annular flow path of fresh air, under front cowls, these cascades moving back with movable rear cowls opening lateral passages in the annular flow path, receiving these cascades to direct the fresh air flow forward, the turbojet engine including fastening points, the nacelle comprising external hatches closing the openings of the front cowls radially disposed outside these fastening points to access it, this nacelle being remarkable in that each hatch opening includes a contour comprising edges of two front cowls.

An advantage of this nacelle is that, each hatch opening including a contour comprising edges of the two front cowls, does not form an entirely closed contour on a same cowl. The two adjacent cowls can then be opened and removed without interfering with this tool while keeping a handling interface installed on a fastening point behind an opening, connected to devices for lifting and transporting.

A turbojet engine of an aircraft can then be removed with its nacelle while keeping the cowls installed on it, then carry it away on a carriage that supports this turbojet engine thanks to its fastening points, up to a maintenance workshop where the front cowls will be easily removed. Thus, the preliminary removal of the front cowls, their protection and their storage under conditions which can be delicate, is avoided, particularly with the aircraft.

The nacelle, according to the present disclosure, can include one or more of the following characteristics, which can be combined together.

Particularly, the nacelle can include on each side a lower front cowl and an upper front cowl, each hatch opening being disposed at the junction of these two cowls.

In this case, a front cowl can include a rectilinear edge, a portion of this rectilinear edge forming one of the opening sides, the other three sides of the opening being formed in the other cowl.

Advantageously, the contour of each hatch opening includes a border forming an offset radially inward of the metal sheet of the front cowls, receiving the thickness of the hatch in an adjusted manner.

Advantageously, the cascades are radially disposed outside the fastening points when the thrust reverser is closed.

Particularly, the nacelle can include two hatch openings substantially disposed on a horizontal diameter of this nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
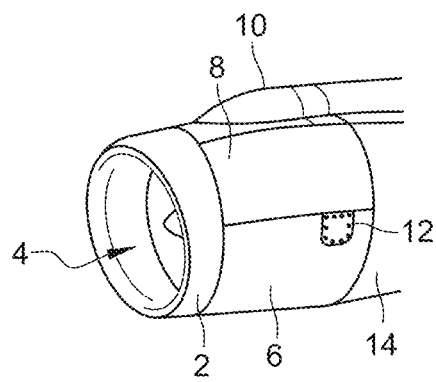
FIG. 1 is a perspective view of a turbojet engine nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For more clarity, the identical or similar elements are marked by identical reference signs on all figures.

Figure 2:
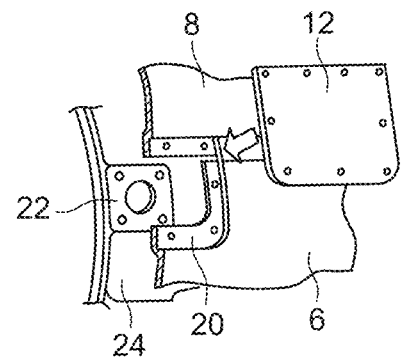
FIG. 2 is a detail view of a portion of a turbojet engine nacelle according to the present disclosure.
Figure 3:
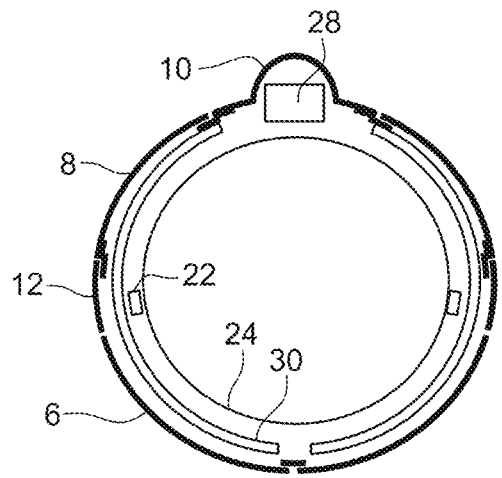
FIG. 3 is a schematic cross-sectional view of the nacelle of FIGS. 1 and 2 passing through the axis of the fastening points.

FIGS. 1, 2, and 3 illustrate a bypass turbojet engine nacelle supported by an engine pylon 28 disposed at a 12 o'clock (12 h) position, including a circular cowl of air inlet 2 disposed at the front, surrounding an air inlet 4.

A front portion forming a cowling section disposed in the extension of the air inlet cowl 2, includes two lower front cowls 6 connected to two upper front cowls 8, each following a connection line substantially disposed at 3 h or at 9 h. An engine pylon cowl 10 connecting the two upper front cowls 8 on top, presents a streamlining covering the engine pylon 28.

A rear portion includes movable rear flaps 14, which move backward by driving thrust reverser cascades 30 to dispose them in lateral passages formed around the annular flow path of cold air, downstream of the front cowls 6, 8.

A fixed annular frame 24 radially disposed behind the thrust reverser cascades 30, includes on each side according to a diameter horizontally disposed, substantially at 3 h and at 9 h, a fastening point 22 including a big central hole for centering a handling element, surrounded by four small holes for fastening this element.

An opening in the front cowls 6, 8 on each side of the nacelle, receiving a substantially square hatch 12, disposed opposite to the fastening point 22, includes an upper side comprising the edge of the bottom of the upper front cowl 8 which is rectilinear, and three other sides formed by a cut out of the lower front cowl 6. In this way, the opening is entirely carried out in the lower front cowl 6 but with edges formed by two cowls, giving a contour which is not enclosed in the same cowl.

The contour of each opening formed on the front cowls 6, 8 includes a border comprising a small offset radially inward of the metal sheet, presenting holes, to receive in an adjusted manner the metal sheet of the hatch 12 fastened on its boundary by a set of screws, by conserving the external aerodynamic streamlining of the nacelle.

Figure 4:
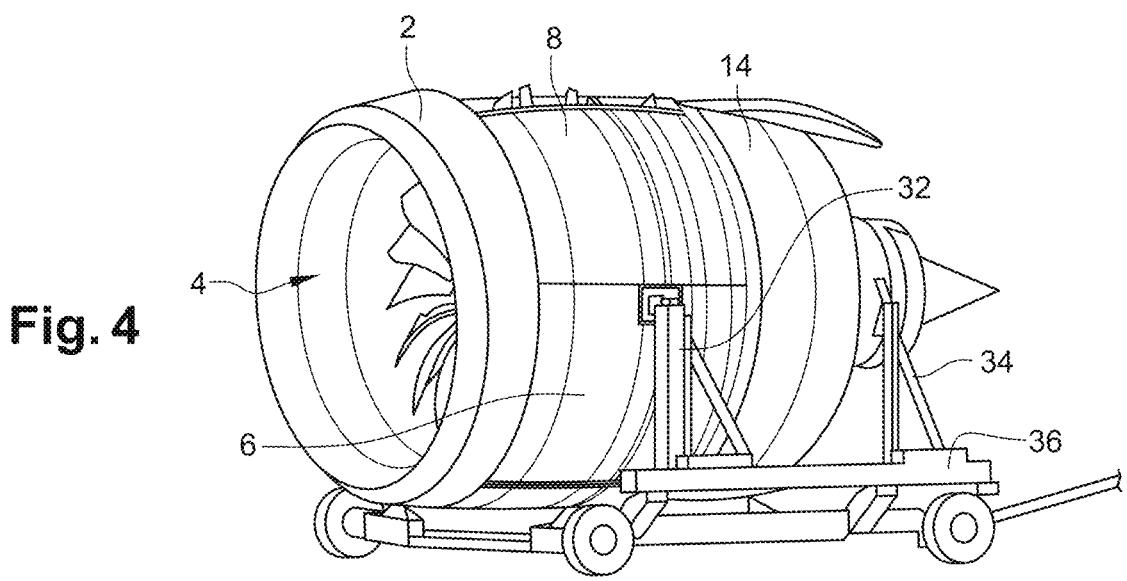
FIG. 4 is a perspective view of the turbojet engine with its nacelle placed on a handling carriage, comprising the hatch openings on the lower front cowls, according to the teachings of the present disclosure.

FIG. 4 shows a turbojet engine equipped with its nacelle removed from the aircraft, after sliding below a carriage 36 on wheels including a rear arm 34 supporting the rear end of the turbojet engine, and a front arm 32 on each side.

After opening the thrust reverser to move the cascades 30 back in order to clear the fastening points 22, and after opening the hatches 12, a handling interface is installed on each fastening point, then the nacelle is fastened to the carriage 36 by these interfaces. The nacelle can then be sent to a maintenance workshop, the cowls having all remained in place, continue to protect the internal equipment of the nacelle.

Figure 5:
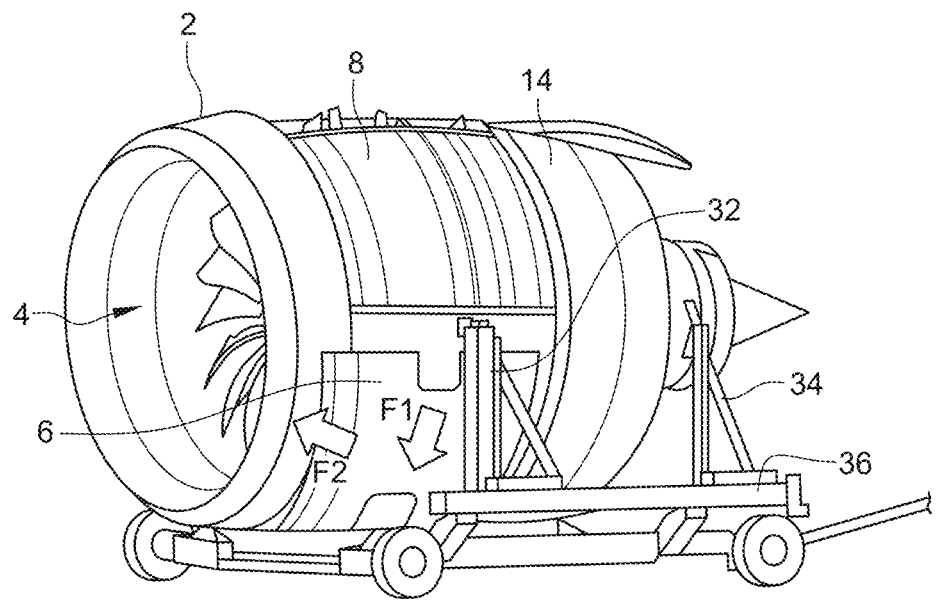
FIG. 5 is a perspective view of the turbojet engine illustrating the removal of the lower front cowls from FIG. 4.

FIG. 5 then shows the withdrawal of the lower front cowls 6 of this nacelle. After removing the fasteners from each lower front cowl 6, this cowl is slid down according to the arrow F1, the handling interface remained in place at the top of the front arm 32 and does not interfere with getting out from the opening of this cowl. Then, the lower front cowl 6 is pulled out by sliding it forward, according to the arrow F2.

Figure 6:
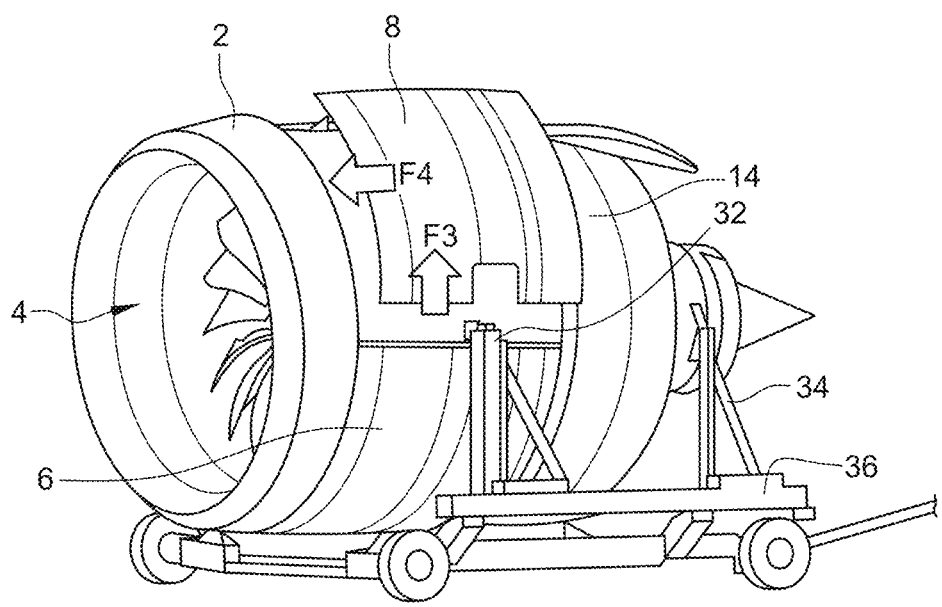
FIG. 6 is a perspective view of the turbojet engine illustrating the removal of the upper front cowls for a nacelle according to a variation of the present disclosure, comprising the hatch openings disposed on these upper front cowls.

FIG. 6 shows a nacelle according to a variant of the present disclosure, including the opening for the handling interface carried out by a cut out of the upper front cowl 8, this opening presenting a side comprising the edge of the top of the lower front cowl 6 which is rectilinear.

After removing the fasteners from each upper front cowl 8, this cowl is slid upward according to arrow F3, without interfering with the handling interface remained in place, then this upper front cowl is pulled out by sliding it forward, according to arrow F4.

According to another variant of the present disclosure, the opening receiving a hatch 12 can be located on the edges of two adjacent cowls at once, each cowl then does not present a rectilinear edge, but a portion of the cut out of this opening.

A significant simplification of the method for removing a motorization with its nacelle and of the intervention on this motorization are obtained in a simple and economic manner, by positioning the edges of the front cowls 6, 8 to get them through the opening receiving the hatches.

It should be noted according to the present disclosure, that the front cowls 6, 8 on a nacelle can include hinges to open them by tilting, or fasteners on the entire boundary to entirely pull them out. The present disclosure can operate in the same way to tilt a cowl by leaving the handling interface.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for a bypass turbojet engine, the nacelle comprising: front cowls and a cascade thrust reverser equipped with thrust reverser cascades and movable rear cowls, the thrust reverser cascades being disposed around an annular flow path of fresh air, under the front cowls, and the thrust reverser cascades moving back with the movable rear cowls opening lateral passages in the annular flow path of fresh air, wherein the lateral passages receive the thrust reverser cascades to direct a fresh air flow forward, the bypass turbojet engine including fastening points, the front cowls comprising openings disposed radially outside the fastening points to access the fastening points, and the nacelle comprising external hatches closing the openings of the front cowls, wherein each of the openings includes a contour delimited by edges of two of the front cowls, and wherein the thrust reverser cascades are radially disposed outside the fastening points when the cascade thrust reverser is closed.

2. The nacelle according to claim 1, wherein the nacelle includes, on each side of a longitudinal plane of the nacelle, a lower front cowl of the front cowls and an upper front cowl of the front cowls, each of the openings being disposed at a junction of the lower front cowl and the upper front cowl.

3. The nacelle according to claim 2, wherein at least one of the front cowls includes a rectilinear edge, wherein a portion of the rectilinear edge forms one side of the contour of one of the openings, other sides of the contour of the one of the openings being formed in another front cowl of the front cowls.

4. The nacelle according to claim 1, wherein the contour of each of the openings includes a border forming a radially inward offset of the front cowls, the radially inward offset receiving a thickness of one of the external hatches in an adjusted manner.

5. The nacelle according to claim 1, wherein the openings of the front cowls include two openings disposed on a horizontal diameter of the nacelle.

* * * * *